United States Patent [19]

Bavaresco

[11] Patent Number: 5,633,693
[45] Date of Patent: May 27, 1997

[54] CROSS-SPRING-JOINT FOR SIDE-PIECES OF SPECTACLES

[76] Inventor: Gian Carlo Bavaresco, Via Rimembranza, 16/A, Quero (BL), Italy, I-32030

[21] Appl. No.: 331,516
[22] PCT Filed: Apr. 30, 1993
[86] PCT No.: PCT/EP93/01029
  § 371 Date: Jan. 9, 1995
  § 102(e) Date: Jan. 9, 1995
[87] PCT Pub. No.: WO93/22705
  PCT Pub. Date: Nov. 11, 1993

[30] Foreign Application Priority Data

May 5, 1992 [IT] Italy ................. BL92A0003

[51] Int. Cl.[6] ............... G02C 5/14; G02C 5/16; G02C 5/22
[52] U.S. Cl. ............ 351/121; 351/113; 351/153; 16/228
[58] Field of Search ................. 351/111, 113, 351/119, 121, 153; 16/228

[56] References Cited

FOREIGN PATENT DOCUMENTS 1139346  6/1957  France ...................... 351/153

*Primary Examiner*—Huy Mai
*Attorney, Agent, or Firm*—Fliesler, Dubb, Meyer & Lovejoy

[57] ABSTRACT

The present invention relates to a new kind of joint, in particular for securing side pieces of spectacles to the frame of spectacles, which is capable of conferring to the bows an appropriate elasticity, both when they are braced over the temples and when they are opened or closed, so that they are not limited by any problems of size. The characteristic feature of the joint is that it has a forked part or forked spring (11 or 111), the ends (112, 114) of which have inner surfaces provided with teeth (122, 123, 124, 125) or grooves (16, 17) with slanting walls shaped so that they stand at right angles to each other and are concentrically arranged around a transverse joint pin (19, 119) linked to a second part inserted between both fork ends (112, 114). Said part is fixed to the frame (18, 118) of the spectacles and allows both parts to rotate, pressing apart the ends (12, 14 or 112, 114) of the fork, achieving the desired elasticity when the parts are rotated.

33 Claims, 2 Drawing Sheets

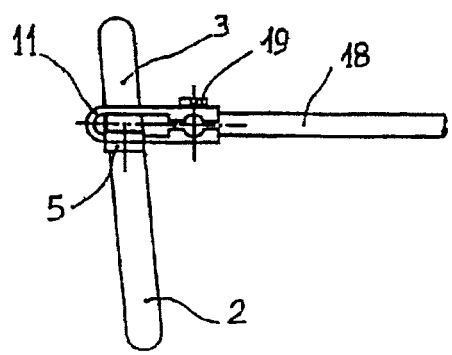
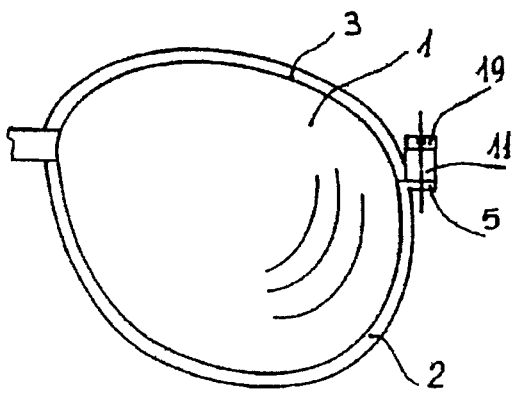
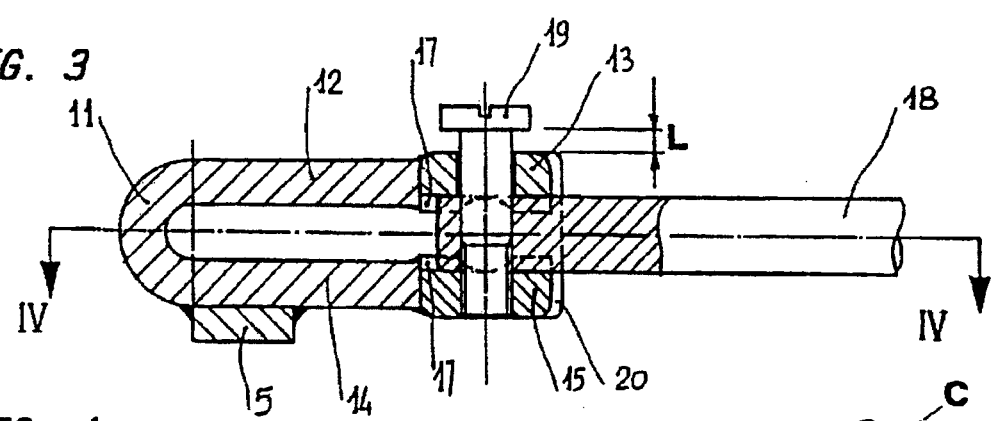
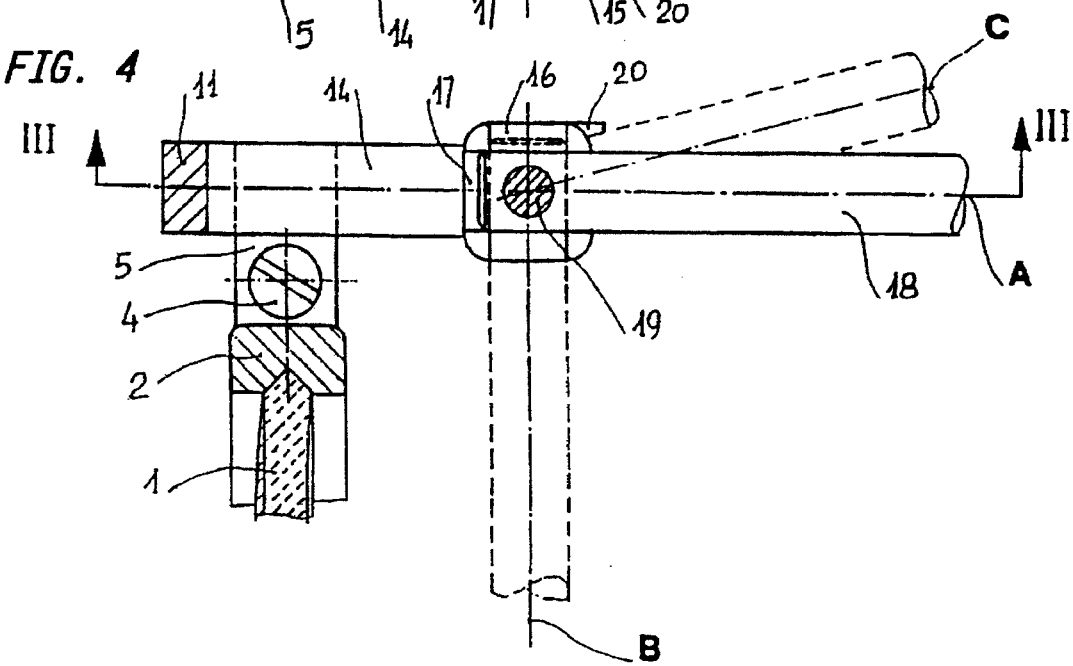

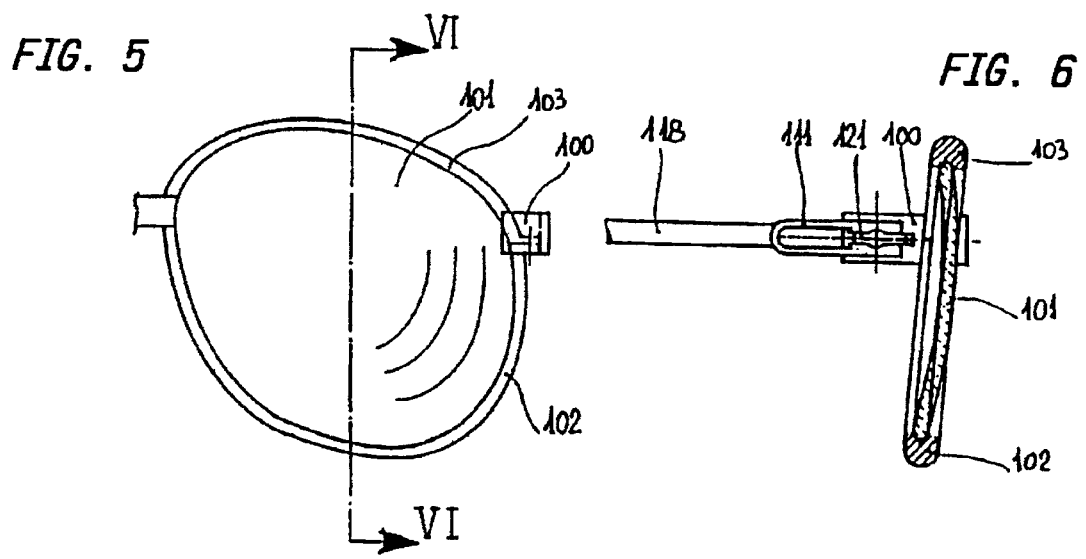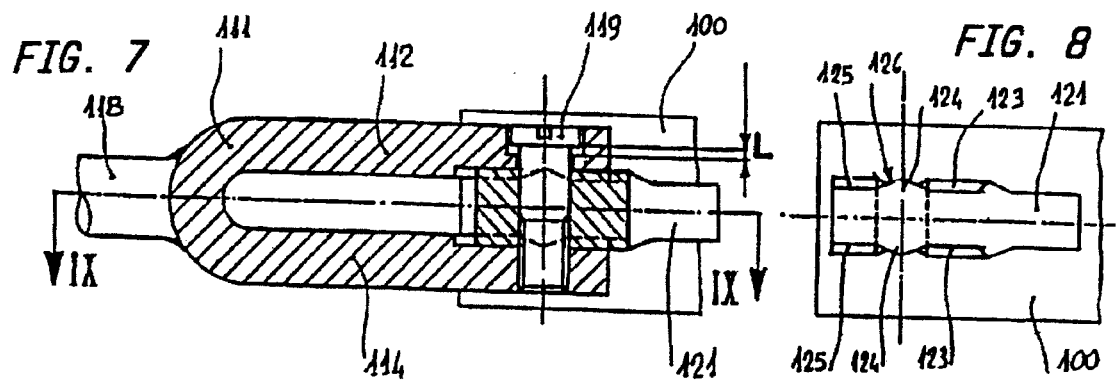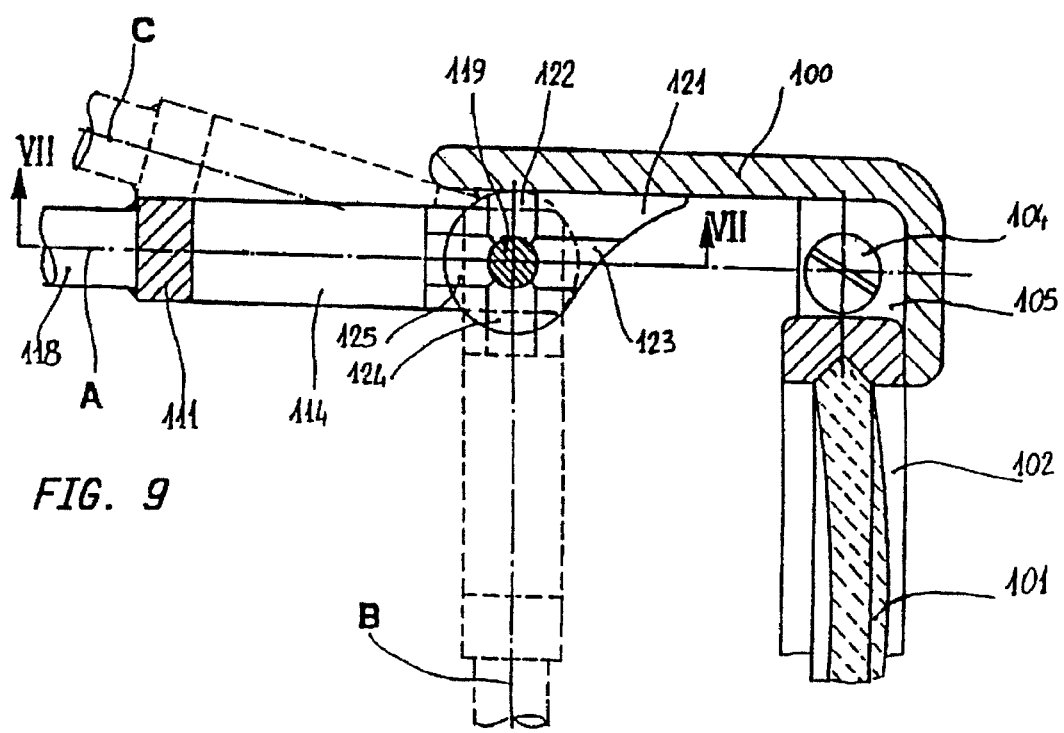

CROSS-SPRING-JOINT FOR SIDE-PIECES OF SPECTACLES

BACKGROUND OF THE INVENTION

1. Field of the Invention

The present invention relates to a new kind of joint, in particular for securing side pieces of spectacles to the frame of spectacles, which joint is capable of elastically securing the side pieces of the spectacles in an open and closed position, and in a position where the side pieces are braced over the temples of an individual wearing the spectacles.

2. Description of the Related Art

Various systems are known in which an elasticity of the side pieces of spectacle frames is achieved. All known systems are based on the installation of an elastic means between the side pieces and joint, which elastic means stores up a part of the straddling force to release it in the form of pressure on the temples or with the snapping motion in the opening and/or closing phase of the side pieces. The known elastic means generally consist of a spring such as for example helical springs, which react on pressure or tension. The spring comprising the elastic means may alternatively consist of leaf springs, which act on direct contact on spherical or differently formed sliders along a profile of a cam that is firmly linked with the spectacles' frame. This cam generally consists of the joint linking the side pieces to the spectacles' frame. However, the cam could be a slider or a specially formed part that acts on the support of the spectacles' frame in which the elastic means is incorporated.

In all known devices for achieving an elasticity, the efficiency is limited by the small dimensions of the elastic means. On the other hand, the elastic means and its other numerous additional parts of which known devices consist must be placed in housings or in holdings of the side pieces which have to be reduced as much as possible. This is time due to aesthetic reasons and by reason of the spectacle size.

The reduction of the components of the known devices to a minimum dimension has the disadvantage of a complicated design and function. Moreover, the reduction of the components to minimum dimensions is the reason for an insufficient function of said devices, and may also be the reason for trouble and irreparable damage to the spectacles.

SUMMARY OF THE INVENTION

It is therefore an advantage of the present invention to produce a joint for side pieces of spectacles which permanently retains its elastic function by having an elastic means not depending on the size of the seating or the dimensions of housings or guidance, so that it can be produced in a suitable size to assure a constant and continuous spring function.

Another advantage of the invention is to limit the components of the elastic device, such as the known guidances, housings, spherical sliders or cams and other component parts, to a small number, which parts otherwise require a corresponding dimensional analysis and often imply a very complex construction and high production costs.

A still further advantage of the present invention to render the assembly or arrangement of the side piece to the joint of the spectacles' frame with an extremely simple design, with the advantage of reduced production time and cost.

Another advantage of the present invention is provide a simple replacement of the side pieces at the spectacles' frame so that different aesthetic solutions for the design of spectacles are made possible.

These problems of the prior art and the achieved advantages are effectively solved with the present invention as appears evident from the following description of one of its constructive solutions. It is understood that the present invention, described hereinafter with respect to the drawings, is not limited to the embodiments set forth herein. Various changes, substitutions and modifications may be made thereto by those skilled in the art without departing from the spirit or scope of the invention as described and defined by the appended claims.

The principle feature of the cross-spring-joint according to embodiments of the present invention is that a side piece end is rotatably fixed in a fork or is provided with a fork, consisting of elastic material and, in one embodiment, having inner surfaces formed by rectangular teeth. This design assures a stable position of the side pieces when they are opened and closed. The change from an open to closed position is facilitated due to the slanting surfaces between the teeth.

The elasticity of the side pieces has a double function. First, the action of the elastic fork snaps the spectacles side pieces to either the open position when the spectacles are to be worn, or to the closed position when the spectacles are taken off. Second, the elastic fork assures a snug fit of the spectacles on the temple of a wearer of the spectacles.

BRIEF DESCRIPTION OF THE DRAWINGS

The invention will now be described with reference to the drawings in which:

FIG. 1 is a side view of a cross-spring-joint between side piece and spectacles frame according to the invention.

FIG. 2 is an external partial view of a spectacles frame according to the invention.

FIG. 3 is a cross-section along axis III—III of FIG. 4, namely a part of the cross-spring-joint schematically shown in FIG. 1.

FIG. 4 is a top view along axis IV—IV of FIG. 3.

FIGS. 5 to 9 show a first variant of the constructive solution for the cross-spring-joint according to the invention:

FIG. 5 is an external front view of a spectacles frame.

FIG. 6 is a cross-section along axis VI—VI of FIG. 5.

FIG. 7 is a cross-section along axis VII—VII of FIG. 9 of the spectacles frame with cross-spring-joint schematically shown in FIG. 6.

FIG. 8 is a view of the linking part between cross-spring-joint and spectacles frame, without the side piece part to be hinged.

FIG. 9 is a top view of the cross-spring-joint part.

DETAILED DESCRIPTION

In the Figures like elements are supplied with like reference numbers.

Part 1 represents a spectacles lens which is supported by a lower frame part 2 and is held together by a upper frame part 3 and by means of a screw 4 which links two small plates 5 according to the state of the art.

On one of the plates 5 a fork spring 11 is fixed which is likewise firmly linked with the spectacles frame consisting of frame arches 2 and 3.

Onto the upper fork end 12 of the fork spring 11 a plate 13 is soldered or fixed in another way which has a through bore-hole, while on the lower fork end 14 a plate 15 is fixed which has a threaded hole that is coaxially arranged to the previous bore-hole.

The opposed internal surfaces of the plates 13 and 15 have grooves 16 and 17 which are disposed rectangular to each other and are formed in such a manner that they can carry the end of the side pieces.

The side piece 18 is held between the plates 13 and 15 since it can very well be inserted in the seats of the groove pair 17 or 16, and is held by a screw 19 which is inserted through the bore-hole of the upper plate 13 and the bore-hole suitably disposed in side piece 18, and is screwed in the threaded hole of the lower plate 15.

The screw 19 must have a backlash L between the base of the screw head and the upper plate 13 to allow the vertical movement of the upper plate 13 when it is elastically stressed. This backlash L has advantageous a value which corresponds to the depth of the grooves or notches 16 and 17.

From FIGS. 3 and 4 is evident that the side piece 18 can move from an opening position A to a closing position B by turning under adequate pressure around the screw 19 as a pivot, and going in this way in a resting position. In fact, the closing position B is achieved by the seating of the side piece 18 in the groove pair 16 formed by the opposed surfaces of the plates 13 and 15, while the seating in the groove pair 17 makes the normal opening position possible.

In passing from position A to position B the side piece 18 must widen the distance between the opposed surfaces of the plates 13 and 15 in order to allow its width to pass through.

The straddling of the plates 13 and 15, which is made possible by the the backlash L, also pushes the upper fork end 12 and the lower fork end 14 of the elastic element 11 apart. This straddling ends as soon as the side piece 18 is in position B, thus, within the groove pair 16.

From what has been described up to now is evident that the elastic element 11 has the function of preventing the removal of the side piece 18 from its seat in groove 17 in the opening position or from its seat in groove 16 in the closing position by exerting an adequate pressure to facilitate the engagement while passing from one groove to another.

Aside from snapping on opening and closing the described device also favours the pressure on the temples when the spectacles are used with opened side pieces. Position C of FIG. 4 shows the maximum straddling being allowed by the cross-spring-joint, limited by a tongue 20.

In position C the side piece 18 is moved out of the groove 17 so that the plates 13 and 15 are straddled too. Consequently the elastic element 11 causes on release the return of the side piece 18 in the seat of groove 17. In this way the elastic element 11 also causes an adequate pressure on the side piece 18 which presses itself close to the temple and so assures best possible fit of the spectacles.

According to what has up to now been described and illustrated, an elastic joint for spectacles is provided which is characterized by the fact that the elastic element 11 is bound to no small sizes of housings, guidances etc., but can be produced in any size, utilizing completely the esthetic possibilities of the spectacles side pieces and assuring an effective and lasting elastic action.

The described joint is made up in the most simple form by eliminating a lot of parts actually necessary for similar joints, guaranteeing the solidity of the few necessary parts. Moreover, the corresponding production times and costs are reduced, and a simple assemblage and an easy interchangeability is achieved in accordance with a further problem to be solved.

The constructive solution up to now described, refers to the arrangement of the fork spring 11 to the frame of the spectacles, so that it is firmly linked with the frame, and to the side piece 18 pivotally inserted between the grooves 17 and 16.

The first variation of the constructive solution described up to now is illustrated in FIGS. 5 to 9 and refers to the solid arrangement of a fork spring 111 on the side piece which turns around the joint pin 119.

The same variation also refers to a different shape of the seats of the grooves 16 and 17, hereafter being described in the shape of slanting planes, as they also can apply to the already described groove seats 16 and 17.

In FIGS. 5 to 9 the same parts already described in the drawings of FIGS. 1 to 4 are designated with the same reference numbers, which, however, are increased for better understanding by 100.

To a plate 105 linking the spectacles frame arches 102 and 103 the angle piece 100 is soldered or fixed for fastening of the lens 101 which is cabable to support a central joint part 121. As is evident from FIGS. 8 and 9 the central joint part is firmly linked with the angle piece 100 and consists of a partially circular shaped flat part with the two supporting surfaces of the joint, having teeth 122, 123, 124 and 125 with slanting tooth surfaces which are disposed rectangular to each other and coaxial to a central bore-hole 126.

The bore-hole 126 takes up the joint screw 119 after the screw 119 is passed through the upper fork end 112 and is screwed into the coaxial threaded hole of the lower fork end 114 of a fork spring 111.

These fork ends 112 and 114 or the plates fixed to these ends are not only penetrated, but also provided with grooves which are disposed rectangular and coaxial to the bore-hole whose depth and inclination have equal values as the teeth 122, 123, 124 and 125.

While screwing in the joint screw 119 on the lower fork end 114 a backlash L must be provided whose dimension corresponds about those of the height of the teeth 122 to 125.

To the elastic element or fork spring 111, respectively, the side piece 118 is soldered or fixed which is moved accordingly and forms a unit with the fork spring 111.

From FIG. 9 becomes evident that for the movement of the spectacles side piece from opening position A in closing position B a rotation of the fork ends 112 and 114 on the slanting surfaces of the teeth 122, 123, 124 and 125 is necessary.

In this rotation the slanting surfaces of the central joint part 121 slide on the corresponding seats of the fork ends 112 and 114 up to their new snapping into the next seat with a 90° rotation of the side piece 118, thus, in its change of position from position A by snapping into position B, which is made possible by the elastic action of the fork spring 111.

Also, in the case of a further straddling to the position C, for example by putting on the side pieces on the temples, a partially sliding of the slanting surfaces of the teeth 122, 123, 124 and 125 on the corresponding seats of the fork ends 112 and 114 takes place, and also a reaction pressure occurs by the straddling of the fork ends 112 and 114 to assure a best possible fit of the spectacles in use.

This possible maximum straddling of the side piece 118 is limited by the stop of the angle piece 100.

In both constructive solutions proposed, i.e. with an elastic element 11 fixed onto the spectacles frame or with the elastic element 111 which is fixed onto the side piece 118 pivotally mounted on the spectacles frame, one has the possibility of using a fork spring which has suitable dimensions and assures a lasting elastic stress without being bound in its size to housings, seats or guidings, according to a further problem of the invention.

In both constructive solutions one achieves an extreme reduction in the number of parts which are necessary for the joint, and that with a sufficient sturdyness and with a relieved assemblage and interchangeability, according to further problem of the invention.

It is evident that the constructive solution proposed in FIGS. 1 to 4 and its first constructive variation according to FIGS. 5 to 9 can ulteriorly be modified and adapted to specific situations. As an example the possibility is to be cited that the position of the teeth 122, 123, 124 and 125 can be inverted, so that they will stand in the elevation (relief) on the internal surfaces of the forks 112 and 114 or on the plates being soldered on these forks, with a corresponding groove on the central joint part 121. It is also possible, for example, to design the cross grooves as simple angle grooves by eliminating the part behind the joint pin 19. It is still possible to use the elastic element for metal frames as well as for plastic frames by adapting it in a suitable manner, and that also as to esthetic aspects. These and other similar modifications or adaptations are to be understood in any case as belonging to the original invention which is to be protected.

I claim:

1. A cross-spring-joint for affixing a spectacles side piece to a spectacles frame, the cross-spring-joint including a fork spring having a first fork end, a second fork end, and a joint pin fitting through bore-holes in the first and second fork ends, the cross-spring-joint comprising:

a first groove provided in at least one of said first and second fork ends, said first groove defining a first longitudinal axis generally through said first groove, said first longitudinal axis being substantially perpendicular to a central axis of the joint pin;

a second groove provided in at least one of said first and second fork ends, said second groove defining a second longitudinal axis generally through said second groove, said second longitudinal axis being substantially perpendicular to said first longitudinal axis and said central axis of the joint pin;

the spectacles side piece being capable of location between the first and second fork ends in said first groove to define a first position of the spectacles side piece with respect to the spectacles frame, or in said second groove to define a second position of the spectacles side piece with respect to the spectacles frame, wherein the spectacles side piece can be rotated around the joint pin between said first and second positions, the first and second fork ends exerting a force on the spectacles side piece to bias the side piece into said first groove or said second groove.

2. The cross-spring-joint according to claim 1, further comprising a linking piece joining said first and second fork ends, said linking piece opposing straddling of said first and second fork ends with respect to each other, such that said fork spring is stressed when said first and second fork ends are straddled with respect to each other.

3. The cross-spring-joint according to claim 2, wherein the spectacles side piece includes a bore hole at an end of said spectacles side piece, said bore hole in the spectacles side piece aligning with the bore holes in said first and second fork ends, said joint pin fitting through said bore holes in said spectacles side piece and said first and second fork ends so that the spectacles side piece is pivotally fixed to the cross-spring-joint.

4. The cross-spring-joint according to claim 3, wherein a pressure is exerted by the stress in the fork spring on the end of the spectacles side piece, so that the spectacles side piece snaps into either said first or second groove, whereby a snapping of the spectacles side piece to said first and second positions is made possible and an adequate pressure of the side pieces on the temples is provided.

5. The cross-spring-joint according to claim 3, wherein said first position of the spectacles side piece with respect to the spectacles frame represents a closed position of the spectacles where the spectacles side piece is adjacent and generally parallel to the spectacles frame, and wherein said second position of the spectacles side piece with respect to the spectacles frame represents an open position of the spectacles where the spectacles side piece is generally perpendicular to the spectacles frame.

6. The cross-spring-joint according to claim 5, wherein the spectacles side piece is capable of moving to a third position with respect to the spectacles frame, said spectacles side piece forming an angle greater than 90° with respect to the spectacles frame in said third position, said third position of said spectacles side piece causing a straddling of the first and second fork ends whereby the fork spring is stressed.

7. The cross-spring-joint according to claim 6, further comprising a stop, said spectacles side piece capable of abutting against said stop to limit the angle of the spectacles side piece with respect to the spectacles frame when the spectacles side piece is in said third position.

8. The cross-spring-joint according to claim 3, wherein one bore hole of the bore holes in the fork ends is threaded, said joint pin being screwed into said threads to secure the joint pin to the fork spring.

9. The cross-spring-joint according to claim 8, wherein the bore hole in the fork ends other than said one bore hole is not threaded, said joint pin fitting through said unthreaded bore hole, said fork ends capable of straddling with respect to the joint pin by relative movement of the joint pin to said unthreaded bore hole.

10. The cross-spring-joint according to claim 8, wherein said spectacles side piece can be removed from the spectacles by unscrewing said joint pin from said threaded bore hole and removing said joint pin.

11. The cross-spring-joint according to claim 2, wherein said spectacles side piece is capable of moving to a third position such that the angle of the spectacle side piece in the third position relative to the first position is greater than the angle of the spectacles side piece in the second position relative to the first position, the spectacles side piece in the third position causing a straddling of the first and second fork end whereby the fork spring is stressed.

12. The cross-spring-joint according to claim 2, wherein a pressure is exerted by the stress in the fork spring on the end of the spectacles side piece, so that the spectacles side piece snaps into the first or second grooves, whereby a snapping of the side piece is made possible and an adequate pressure of the side pieces on the temples is provided.

13. The cross-spring-joint according to claim 12, wherein the joint pin has a backlash whose length substantially corresponds to the depth of said first and second grooves.

14. The cross-spring-joint according to claim 1, wherein the joint pin has a backlash whose length substantially corresponds to the depth of said first and second grooves.

15. The cross-spring-joint according to claim 1, further comprising a central joint part including first and second sets of slanting teeth capable of mating with said first and second grooves, said first set of slanting teeth having a longitudinal axis substantially perpendicular to a longitudinal axis of said second set of slanting teeth.

16. The cross-spring-joint according to claim 15, wherein the stress in the fork spring biases the first and second fork ends into snug engagement with the slanting surfaces of the first and second sets of slanting teeth, whereby a snapping motion of the spectacles side piece toward said first or second positions takes place when the spectacles side piece is moved between said first and second positions.

17. The cross-spring-joint according to claim 15, wherein rotation of the spectacles side piece between said first and second positions around the joint pin causes the first or second sets of slanting teeth to glide on corresponding opposed groove surfaces, whereby straddling of the fork ends and stress in the fork spring takes place.

18. The cross-spring-joint according to claim 17, wherein the stress in the fork spring biases the fork ends into snug engagement with the first and second sets of slanting teeth, whereby a snapping motion of the spectacles side piece toward said first or second positions takes place when the spectacles side piece is moved between said first and second positions.

19. The cross-spring-joint according to claim 15, wherein the first and second grooves include opposed surfaces having slanting wall teeth which are disposed as negative with respect to the first and second sets of slanting teeth, so that the slanting wall teeth in the grooves mate with the first and second sets of slanting teeth in the central joint part, the first and second fork ends and the central joint part being linked with each other by the joint pin, and maintain a sufficient backlash.

20. The cross-spring-joint according to claim 19, wherein the stress in the fork spring biases the fork ends into snug engagement with the first and second sets of slanting teeth, whereby a snapping motion of the spectacles side piece toward said first or second positions takes place when the spectacles side piece are moved between said first and second positions.

21. The cross-spring-joint according to claim 19, wherein rotation of the spectacles side piece between said first and second positions around the joint pin cause the first or second sets of slanting teeth to glide on corresponding opposed groove surfaces, whereby straddling of the fork ends and stress in the fork spring take place.

22. The cross-spring-joint according to claim 21, wherein the stress in the fork spring biases the fork ends into snug engagement with the first and second sets of slanting teeth, whereby a snapping motion of the spectacles side piece toward said first or second positions takes place when the spectacles side piece is moved between said first and second positions.

23. The cross-spring-joint according to claim 15, wherein the joint pin has a backlash whose length substantially corresponds to the depth of said first and second grooves.

24. The cross-spring-joint according to claim 1, wherein the fork spring is stationarily affixed to the spectacles side piece and moves with respect to the spectacles frame.

25. The cross-spring-joint according to claim 1, wherein the fork spring is stationarily affixed with respect to the spectacles frame and moves with respect to the spectacles side piece.

26. The cross-spring-joint according to claim 1, wherein said first groove has a semicircular cross section in a plane perpendicular to said first longitudinal axis, and said second groove has a semicircular cross section in a plane perpendicular to said second longitudinal axis.

27. The cross-spring-joint according to claim 1, wherein said first groove has straight surfaces angled with respect to each other to form a concave shape in cross section through a plane perpendicular to said first longitudinal axis, and said second groove has straight surfaces angled with respect to each other to form a concave shape in cross section through a plane perpendicular to said second longitudinal axis.

28. The cross-spring-joint according to claim 1, wherein said first groove has straight surfaces angled with respect to each other to form a convex shape in cross section through a plane perpendicular to said first longitudinal axis, and said second groove has straight surfaces angled with respect to each other to form a convex shape in cross section through a plane perpendicular to said second longitudinal axis.

29. A cross-spring-joint for affixing a spectacles side piece to a spectacles frame, the cross-spring-joint including a fork spring having a first fork end, a second fork end, and a joint pin fitting through bore-holes in the first and second fork ends, the cross-spring-joint comprising:

a first groove provided in at least one of said first and second fork ends, said first groove defining a first longitudinal axis generally through said first groove, said first reference axis being substantially perpendicular to a central axis of the joint pin;

a second groove provided in at least one of said first and second fork ends, said second groove defining a second longitudinal axis generally through said second groove, said second longitudinal axis being substantially perpendicular to said first longitudinal axis and said central axis of the joint pin;

the spectacles side piece being capable of location between the first and second fork ends in said first groove to define a first position of the spectacles side piece with respect to the cross-spring joint, or in said second groove to define a second position of the spectacles side piece with respect to the cross-spring-joint, wherein the spectacles side piece can be rotated around the joint pin between said first and second positions, the first and second fork ends exerting a force on the spectacles side piece to alternately hold the side piece in said first groove or said second groove.

30. A cross-spring-joint for affixing a spectacles side piece to a spectacles frame, the cross-spring-joint including a fork spring having a first fork end, a second fork end, and a joint pin fitting through bore-holes in the first and second fork ends, the cross-spring-joint comprising:

a first groove provided in at least one of said first and second fork ends, said first groove defining a first longitudinal axis generally through said first groove, said first reference axis being substantially perpendicular to a central axis of the joint pin;

a second groove provided in at least one of said first and second fork ends, said second groove defining a second longitudinal axis generally through said second groove, said second longitudinal axis being substantially perpendicular to said first longitudinal axis and said central axis of the joint pin;

the spectacles side piece being capable of location between the first and second fork ends in said first groove to define a first position of the spectacles side piece with respect to the cross-spring joint, or in said second groove to define a second position of the spectacles side piece with respect to the cross-spring-joint, wherein the spectacles side piece can be rotated around the joint pin between said first and second positions, the first and second fork ends exerting a force on the spectacles side piece to bias the side piece into said first groove or said second groove;

wherein a straddling of the first and second fork ends creates a stress in the fork spring, said stress exerting a pressure on the end of the spectacles side piece, so that the spectacles side piece snaps into either said first or second groove, whereby a snapping of the spectacles side piece to said first and second positions is made possible and an adequate pressure of the side pieces on the temples is provided; and wherein the spectacles side piece is capable of moving to a third position with respect to the spectacles frame, said spectacles side piece forming an angle greater than 90° with respect to the spectacles frame in said third position, said third position of said spectacles side piece causing a straddling of the first and second fork ends whereby the fork spring is stressed.

31. The cross-spring-joint according to claim 30, further comprising a stop, said spectacles side piece capable of abutting against said stop to limit the angle of the spectacles side piece with respect to the spectacles frame when the spectacles side piece is in said third position.

32. The cross-spring-joint according to claim 30, wherein a pressure is exerted by the stress in the fork spring on the end of the spectacles side piece, so that the spectacles side piece sta snaps into the first or second grooves.

33. A cross-spring-joint for affixing a spectacles side piece to a spectacles frame, the cross-spring-joint including a fork spring having a first fork end, a second fork end, and a joint pin fitting through bore-holes in the first and second fork ends, the cross-spring-joint comprising:

a first groove provided in at least one of said first and second fork ends, said first groove defining a first longitudinal axis generally through said first groove, said first reference axis being substantially perpendicular to a central axis of the joint pin;

a second groove provided in at least one of said first and second fork ends, said second groove defining a second longitudinal axis generally through said second groove, said second longitudinal axis being substantially perpendicular to said first longitudinal axis and said central axis of the joint pin;

the spectacles side piece being capable of location between the first and second fork ends in said first groove to define a first position of the spectacles side piece with respect to the cross-spring joint, or in said second groove to define a second position of the spectacles side piece with respect to the cross-spring-joint, wherein the spectacles side piece can be rotated around the joint pin between said first and second positions, the first and second fork ends exerting a force on the spectacles side piece to bias the side piece into said first groove or said second groove;

wherein said fork spring is stressed when said first and second fork ends are straddled with respect to each other; and wherein said spectacles side piece is capable of moving to a third position such that the angle of the spectacle side piece in the third position relative to the first position is greater than the angle of the spectacles side piece in the second position relative to the first position, the spectacles side piece in the third position causing a straddling of the first and second fork ends whereby the fork spring is stressed.

* * * * *